(12) United States Patent
Lu et al.

(10) Patent No.: US 9,443,664 B2
(45) Date of Patent: Sep. 13, 2016

(54) SUPERCAPACITOR WITH METAL CYANOMETALLATE ANODE AND CARBONACEOUS CATHODE

(71) Applicant: Sharp Laboratories of America, Inc., Camas, WA (US)

(72) Inventors: Yuhao Lu, Vancouver, WA (US); Long Wang, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 184 days.

(21) Appl. No.: 14/274,686

(22) Filed: May 10, 2014

(65) Prior Publication Data

US 2014/0239920 A1    Aug. 28, 2014

Related U.S. Application Data

(63) Continuation-in-part of application No. 13/603,322, filed on Sep. 4, 2012, now Pat. No. 9,159,502, which is a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.
*H01M 2/00* (2006.01)
*H01G 11/32* (2013.01)
*H01G 11/30* (2013.01)
*H02J 7/34* (2006.01)

(52) U.S. Cl.
CPC .............. *H01G 11/32* (2013.01); *H01G 11/30* (2013.01); *H02J 7/345* (2013.01); *Y02E 60/13* (2013.01)

(58) Field of Classification Search
CPC ....... H01G 11/32; H01G 11/30; H02J 7/345; Y02E 60/13; H01M 4/58; H01M 2/16; H01M 10/0525; H01M 4/583; H01M 4/38
See application file for complete search history.

(56) References Cited

U.S. PATENT DOCUMENTS

2012/0328936 A1*  12/2012  Wessells ............. H01M 10/054
                                                                    429/188

FOREIGN PATENT DOCUMENTS

JP         2011-180469         9/2011

OTHER PUBLICATIONS

V. D. Neff, "Some Performance Characteristics of a Prussian Blue Battery", Journal of Electrochemical Society 1985, 132, 1382-1384.

(Continued)

*Primary Examiner* — Cynthia H Kelly
*Assistant Examiner* — Monique Wills
(74) *Attorney, Agent, or Firm* — Law Office of Gerald Maliszewski; Gerald Maliszewski (57) ABSTRACT

A method is provided for charging a supercapacitor. The method initially provides a supercapacitor with a metal cyanometallate (MCM) particle anode, an electrolyte including a salt (DB) made up of cations ($D^+$) anions ($B^-$), and a cathode including carbonaceous materials ($\square$). The method connects an external charging device between the anode and cathode, and the charging device supplies electrons to the anode and accepting electrons from the cathode. In response to the charging device, cations are inserted into the anode while anions are absorbed on the surface of the cathode. A supercapacitor device is also presented.

17 Claims, 3 Drawing Sheets

(56) References Cited

OTHER PUBLICATIONS

N. Imanishi et al., "Lithium Intercalation Behavior into Iron Cyanide Complex as Positive Electrode of Lithium Secondary Battery", Journal of Power Sources 1999, 79, 215-219.

Y. Lu, L. Wang, J. Cheng, and J. B. Goodenough, "Prussian Blue; a New Framework for Sodium Batteries", Chemistry Communications 2012, 48, 6544-6546.

L. Wang et al., "A Superior Low-Cost Cathode for a Na-ion Battery", Angewandte Chemie International Edition 2013, 52, 1964-1967.

A. Eftekhari, "Potassium Secondary Cell Based on Prussian Blue Cathode", Journal of Power Sources 2004, 126, 221-228.

C. D. Wessells et al., "Copper Hexacyanoferrate Battery Electrodes with Long Cycle Life and High Power", Nature Communications 2011, 2, Article No. 550.

C. D. Wessells et al., "Nickle Hexacyanoferrate Nanoparticle Electrodes for Aqueous Sodium and Potassium Ion Batteries", Nano Letters 2011, 11, 5421-5425.

C. D. Wessells et al., "The Effect of Insertion Species on Nanostructured Open Framework . . . ," Journal of the Electrochemical Society 2012, 159, A98-A103.

T. Matsuda, M. Takachi, and Y. Moritomo, "A Sodium Manganese Ferrocyanide Thin Film for Na-ion Batteries", Chemical Communications 2013, 49, 2750-2752.

S-H. Yu et al., "Iron Hexacyanoferrate Nanoparticles as Cathode Materials for Lithium and Sodium Rechargeable Batteries", ECS Electrochemistry Letters 2013,2, A39-A41.

P. Kulesza,Electrochemical Charging of Ultra-Thin Films of Conducting Polymer Supported Carbon Nanotubes: Application to Supercapacitors,ECS Transaction, 6(25) 245-256 (2008).

M. Hu and J. S. Jiang, "Facile Synthesis of Air-Stable Prussian White Microcubes via a Hydrothermal Method", Materials Research Bulletin 2011, 46, 702-707.

S-H. Lee and Y-D. Huh, "Preferential Evolution of Prussian Blue's Morphology from Cube to Hexapod", The Bulletin of the Korean Chemical Society 2012, 33, 1078-1080.

M. Hu, J-S. Jiang, C-C. Lin, and Y. Zeng, "Prussian Blue Mesocrystals: an Example of Self-Construction", CrystEngComm 2010, 12, 2679-2683.

M. Hu, R-P. Ji, and J-S. Jiang, "Hydrothermal Synthesis of Magnetite Crystals: from Sheet to Pseudo-Octahedron", Materials Reserch Bulletin 2010, 45, 1811-1715.

\* cited by examiner

SUPERCAPACITOR WITH METAL CYANOMETALLATE ANODE AND CARBONACEOUS CATHODE

RELATED APPLICATIONS

This application is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012;

which is a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All the above-referenced applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical capacitors and, more particularly, to a supercapacitor made from a hexacyanometallate cathode and activated carbon anode.

2. Description of the Related Art

A supercapacitor, or electrochemical capacitor (EC), constitutes one type of device for electrochemical energy storage and conversion. The electrochemical capacitor consists of two electrodes separated by an electrolyte-soaked separator by which the two electrodes are electrically isolated. Based upon the electrode type and the energy storage mechanism, the supercapacitor may be classified into one of the two following categories: (1) an electric double layer capacitor (EDLC), in which the energy is stored at the interface between the electrode and electrolyte through electrostatic charge accumulation, or (2) a pseudo-capacitor (or ultra-capacitor), whereby one electrode undergoes faradic reactions while the other electrode maintains the electrostatic charge accumulation.

In comparison to batteries and fuel cells, supercapacitors have the highest power density (watt per kilogram) due to the rapid movement of ions between the electrode and electrolyte. However, at the same time, the energy storage mechanism restricts its energy density (watt-hours per kilogram). Charge adsorption on the electrode surface dominates the energy storage in EDLCs. The performance of electrode materials can be evaluated by capacitance (F/g, Farad/gram), which can be defined as the charge accumulation with the voltage change per gram of electrode material: $C=(\Delta Q/\Delta V)/m$, where Q is the accumulated charge, V is the voltage of the electrode materials, and m is the mass of the active materials of the electrode. The state-of-the-art commercial activated carbon materials have surface areas of 1000-3500 $m^2/g$ and capacitances of ~200 F/g [1]. Physical adsorption of the electrostatic charge restricts the capacitance from further increases. Therefore, the introduction of faradic reactions to supercapacitors results in the so-called pseudo-/ultra-capacitors.

In general, pseudo-capacitors demonstrate much larger capacitances than EDLC because Faradic reactions can store charges both on the surface and in the bulk of the electrode materials. Ruthenium oxide ($RuO_2$), for example, exhibits a high capacitance of 720 F/g [2] based upon the faradic reaction of $RuO_x(OH)_y + zH^+ + ze^- \leftarrow \rightarrow RuO_{x-z}(OH)_{y+z}$ where the redox couple, $Ru^{3+/4+}$, is reversible during the dis/charge process. Except for the appropriate redox couples, a robust material for the pseudo-capacitor electrode must demonstrate fast transport of charges and electrons in its structure(s), in order to ensure a high power density. Although Faradic reactions increase the capacitance of electrode materials significantly, both the transfer of charges and migration of ions result in a change of volume, which deteriorates their structure during cycling. For that reason, pseudo-/ultra-capacitors exhibit a shorter cycling life than EDLCs. Thus, more stable materials are actively being developing for this class of capacitor.

Figure 1:
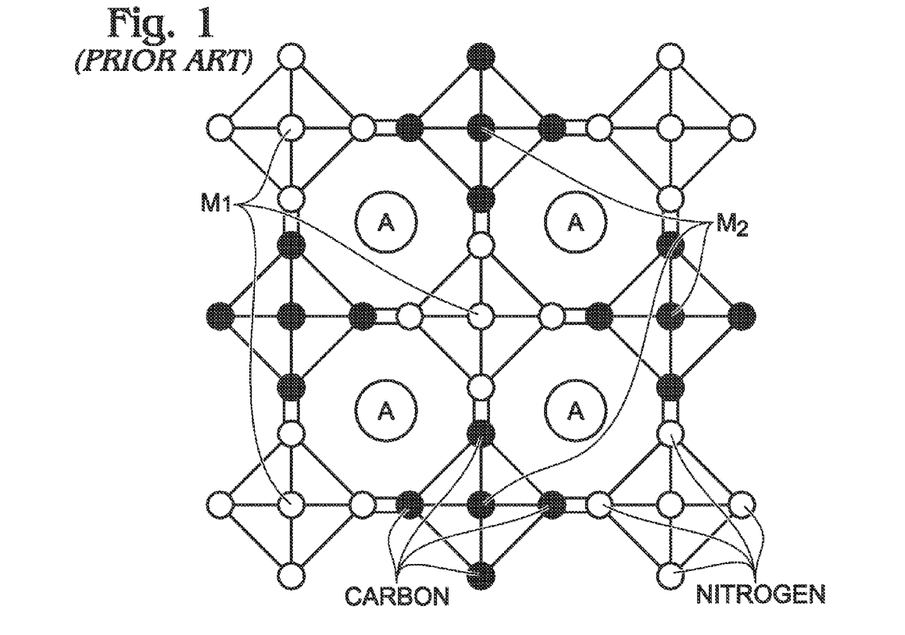
FIG. 1 depicts the crystal structure of a metal hexacyanometallate (prior art).

FIG. 1 depicts the crystal structure of a metal hexacyanometallate (prior art). Prussian blue analogues belong to a class of mixed valence compounds called transition metal hexacyanometallates. The hexacyanometallates have a general formula $A_mM1_xM2_y(CN)_6$, where M1 and M2 are transition metals. In many cases, the transition metal hexacyanometallates may contain a variety of ions ($A=Li^+$, $Cs^+$, $Na^+$, $K^+$, $NH_4^+$, $Co^{2+}$, $Cu^{2+}$, etc.) and various amounts of water in the crystal structure. As is shown in the figure, the crystal structure of metal hexacyanometallates has an open framework which can facilitate fast and reversible intercalation processes for alkali and alkaline ions ($A_m$). The number of alkali or alkaline ions in the large cages of this crystallographically porous framework may vary from m=0 to m=2 depending on the valence of M1 and M2.

Twenty years ago, Widmann, et al, demonstrated that $K^{30}$-ions reversibly insert/deinsert into/from the copper, nickel, and iron hexacyanoferrates/hexacyanocobaltates Prussian blue analogues, $KNiFe(CN)_6$, $KCuFe(CN)_6$, and $KFeFe(CN)_6$ in aqueous solution [3] Eftekhari [4] assembled an iron hexacyanoferrate (Prussian blue)/potassium battery with an organic electrolyte [1M $KBF_4$ in ethylene carbonate/ethylmethyl carbonate (3:7 by wt.)]. The results proved that Prussian blue was a good electrode material for the potassium-ion battery with a reversible capacity of ca. 75 mAh/g.

Dr. Goodenough's, group [5] investigated a series of Prussian blue analogues in a sodium battery with organic electrolyte, and found that $KFe(II)Fe(III)(CN)_6$ demonstrated the highest capacity of ca. 95 mAh/g, while $KMnFe(CN)_6$, $KNiFe(CN)_6$, $KCuFe(CN)_6$, and $KCoFe(CN)_6$ demonstrated a capacity of 50~70 mAh/g. In the first 30 cycles, the capacity retention of $KFeFe(CN)_6$ was higher than 97%.

Recently, Cui's group studied the $Na^+/K^+$ ion intercalation of copper ($KCuFe(CN)_6$) and nickel hexacyanoferrates ($KNiFe(CN)_6$) in aqueous solution. Their results demonstrated the rapid movement of $Li^+$, $Na^+$, $K^+$, and $NH_4^+$-ions in the Prussian blue analogues, as well as long cycling life for the electrode materials [6-8]. Patent application Ser. No. 13/603,322, Supercapacitor with Hexacyanometallate Cathode, Activated Carbon Anode, and Aqueous Electrolyte, incorporated herein by reference, describes a method for fabricating a supercapacitor with a hexacyanometallate (positive electrode), an activate carbon (negative electrode), and an aqueous electrolyte containing metal salt. Alkali ion or alkaline earth ions are inserted in, and extracted from the hexacyanometallate lattice during the charge/discharge of the supercapacitor. In this kind of supercapacitor, cations have to be released from the hexacyanometallates first, and then they are absorbed on the surface of activated carbon. The process corresponds to a charge process where the potential for hexacyanometallates becomes more positive and for activated carbon is more negative. The fast ion movement in MHCMs makes it possible for this material to perform effectively as the electrode in supercapacitors.

It would be advantageous if during charge, cations in electrolyte could be inserted into the metal cyanometallate electrode to make its potential more negative, while anions are absorbed onto the surface of activated carbon to make its potential more positive.

It would be advantageous if both cations and anions could move back and forth between positive and negative electrodes during the charge and discharge cycles.

[1] L. L. Zhang, X. S. Zhao, Carbon-based materials as supercapacitor electrodes, Chem. Soc. Rev., 38 (2009) 2520-2531.
[2] J. P. Zheng, P. J. Cygan, T. R. Jow, Hydrous ruthenium oxide as an electrode material for electrochemical capacitors, J. Electrochem. Soc., 142 (1995) 2699-2703.
[3] A. Widmann, H. Kahlert, I. Petrovic-Prelevic, H. Wulff, J. V. Yakhmi, N. Bagkar, F. Scholz, Structure, insertion electrochemistry, and magnetic properties of a new type of substitutional solid solution of copper, nickel and iron hexacyanoferrates/hexacyanocobaltates, Inorg. Chem., 41(2002)5706-5715.
[4] A. Eftekhari, Potassium secondary cell based on Prussian blue cathode, J. Power Sources, 126 (2004) 221-228.
[5] Y. Lu, L. Wang, J. Cheng, J. B. Goodenough, Prussian blue: a new framework of electrode materials for sodium battery, Chem. Commun. 52(2012)6544-6546.
[6] C. D. Wessells, R. A. Huggins, Y. Cui, Copper hexacyanoferrate battery electrodes with long cycle life and high power, Nature Communication, 2(2011) 550.
[7] Wessells, S. V. Peddada, H. A. Huggins, Y. Cui, Nickel hexacyanoferrate nanoparticle electrodes for aqueous sodium and potassium ion batteries. Nano Lett., 11(2011) 5421-5425.
[8] C. D. Wessels, S. V. Peddada, M. T. McDowell, R. A. Huggins, Y. Cui, The effect of insertion species on nanostructured open framework hexacyanoferrate battery electrode, J. Electrochem. Soc., 159(2012) A98-A103.

SUMMARY OF THE INVENTION

Unlike the reported work cited above in the Background Section, a supercapacitor is described herein that has a metal cyanometallate (MCM) electrode that functions as the negative electrode (anode), and carbonaceous materials that perform as positive electrode (cathode). During charge, cations in electrolyte are inserted into the MCMs electrode to make its potential more negative, and anions are absorbed onto the surface of activated carbon to make its potential becomes more positive. Further, both cations and anions move back and forth between positive and negative electrodes during the charge and discharge cycle.

More explicitly, the MCM material can be described using the chemical formula of $A_X M1_Y M2_Z(CN)_N \cdot MH_2O$. M1 and M2 may be the same or different metal ions, such as titanium (Ti), vanadium (V), chromium (Cr), manganese (Mn), iron (Fe), cobalt (Co), nickel (Ni), copper (Cu), zinc (Zn), Ca, Mg, strontium (Sr), and barium (Ba). "A" may be selected from a broad group of cations including alkali and alkaline earth metals. The electrolyte may be an aqueous, non-aqueous, polymer, gel, or solid electrolyte. The electrolyte contains salts, DB, to realize the energy storage and conversion. The cations, D, can be hydrogen ($H^+$), lithium ($Li^+$), sodium ($Na^+$), potassium ($K^+$), ammonium ($NH_4^+$), rubidium ($Rb^+$), cesium ($Cs^+$), magnesium ($Mg^{2+}$), calcium ($Ca^{2+}$), strontium ($Sr^{2+}$), barium ($Ba^{2+}$), cobalt ($Co^{2+}$), iron ($Fe^{2+}$), $Fe^{3+}$, copper ($Cu^{2+}$), tetramethylammonium, tetraethylammonium, or complex cations. The anions, B, can be selected from fluorine (F), chlorine (Cl), bromine (Br), iodine (I), carbon trioxide ($CO_3$), sulfur trioxide ($SO_3$), sulfate ($SO_4$), phosphate ($PO_4$), aluminate anion ($AlO_2$), nitrate ($NO_3$), hydroxide ($OH^-$), perchlorate ($ClO_4$), tetrafluoroborate anion ($BF_4^-$), hexafluorophosphate ($PF_6$), hexafluoroarsenate ion ($AsS_6$), trifluoromethanesulfonic ($CF_3SO_3$), N-fluoromethanesulfony ($N(SO_2CF_3)_2$), N-fluoroethanesulfony imide ($N(SO_2CF_2CF_3)_2$), complex anions, or combinations thereof. The supercapacitor demonstrates a high power density due to the rapid ion-transport, and a high capacitance due to the ion interaction in the MCM electrode.

Accordingly, a method is provided for charging a supercapacitor. The method initially provides a supercapacitor with a MCM particle anode, an electrolyte including a salt (DB) made up of cations ($D^+$) and anions ($B^-$), and a cathode including carbonaceous materials (□). The method connects an external charging device between the anode and cathode, and the charging device supplies electrons to the anode and accepts electrons from the cathode. In response to the charging device, cations are inserted into the anode while anions are absorbed on the surface of the cathode.

More explicitly, anions are absorbed at the cathode as follows:

where "d" and "b" are quantities.

At the same time, cations are inserted into the anode as follows:

Additional details of the above-described method and a supercapacitor device are presented below.

DETAILED DESCRIPTION

Figure 2:
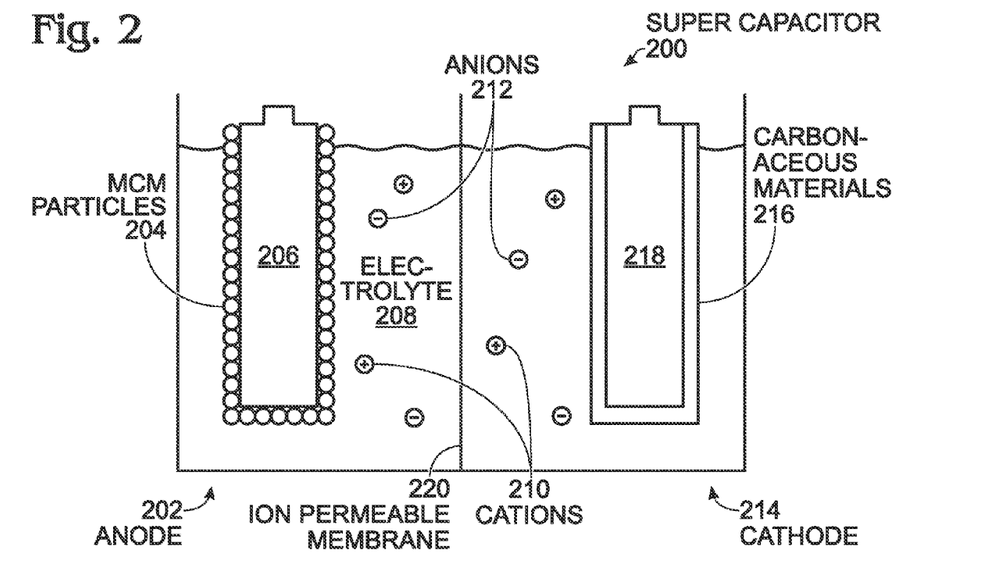
FIG. 2 is a partial cross-sectional view of a supercapacitor.

FIG. 2 is a partial cross-sectional view of a supercapacitor. The supercapacitor 200 comprises an anode 202 including metal cyanometallate, (MCM) particles 204 overlying a current collector 206. The MCM particles 204 have the chemical formula $A_X M1_Y M2_Z(CN)_N \cdot MH_2O$;

where "A" is selected from a first group of metals;

where M1 and M2 are transition metals;

where X is less than or equal to 2;

where Y is less than or equal to 1;

where Z is less than or equal to 1;
where N is less than or equal to 6; and,
where M is less than or equal to 20.

An electrolyte 208 includes cations 210 selected from a second group of materials and anions 212 selected from a third group of materials. A cathode 214 including carbonaceous materials 216 overlies a current collector 218.

The first group of metals includes alkali metals, alkaline earth metals, and combinations thereof. More explicitly, the first group of metals includes lithium (Li), sodium (Na), potassium (K), rubidium (Rb), cesium (Cs), calcium (Ca), strontium (Sr), barium (Ba), silver (Ag), aluminum (Al), and magnesium (Mg). M1 is a metal with $2^+$ or $3^+$ valance positions. Likewise, M2 is a metal with $2^+$ or $3^+$ valance positions. M1 and M2 are each independently derived, meaning they may be the same metal or different metals. Some examples of typical M1 and M2 metals include titanium (Ti), vanadium (V), chromium (Cr), manganese (Mn), iron (Fe), cobalt (Co), nickel (Ni), copper (Cu), zinc (Zn), Ca, Mg, strontium (Sr), and barium (Ba).

The second group of materials that make up the cations 210 include hydrogen (H), Li, Na, K, ammonium ($NH_4$), Rb, Cs, Mg, Ca, Sr, Ba, Co, Fe, Cu, tetramethylammonium, tetraethylammonium, and combinations thereof. The third group of materials that make up the anions 212 include fluorine (F), chlorine (Cl), bromine (Br), iodine (I), carbon trioxide ($CO_3$), sulfur trioxide ($SO_3$), sulfate ($SO_4$), phosphate ($PO_4$), aluminate anion ($AlO_2$), nitrate ($NO_3$), hydroxide ($OH^-$), perchlorate ($ClO_4$), tetrafluoroborate anion ($BF_4^-$), hexafluorophosphate ($PF_6$), hexafluoroarsenate ion ($AsS_6$), trifluoromethanesulfonic ($CF_3SO_3$), N-fluoromethanesulfony ($N(SO_2CF_3)_2$), N-fluoroethanesulfony imide ($N(SO_2CF_2CF_3)_2$), and combinations thereof.

The electrolyte 208 may be an aqueous, non-aqueous, polymer, gel, or solid electrolyte. Typically, an ion permeable membrane 220 is used to separate the anode 202 from the cathode 214. Both the MCM particles 204 and carbonaceous materials 216 are porous materials that enable electrolyte to fill their pores. The carbonaceous materials 216 of the cathode 214 may be activated carbon, carbon black, carbon paper, or carbon cloth.

The MCM particles $A_XM1_YM2_Z(CN)_N \cdot MH_2O$ demonstrate frameworks that consist of M1-N—C-M2 skeletons and large interstitial space as shown in FIG. 1 that "A" cations can occupy. The cations can be quickly and reversibly inserted/extracted into/out their interstitial spaces, making MCM a good electrode material for supercapacitors. Carbonaceous materials (e.g. activated carbon) are used as the counter electrode. To realize the ion transport between the two electrodes, aqueous, non-aqueous, gel, polymer, or solid electrolytes can be used between them.

To explain the mechanism of the supercapacitor, it is assumed that a salt. DB, is dissolved in the electrolyte. During charge, cations, $D^+$, are inserted into MCM electrode (anode or negative electrode), and anions, $B^-$, are absorbed onto the surface of carbonaceous electrode (cathode or positive electrode). Meanwhile, electrons move from positive electrode to negative electrode through an external circuit (current source or charger). The process can be described as:

Positive electrode:

$$d B^- + \square \rightarrow d(B^-)//\square^+ + be^-; \square = \text{a carbonaceous material}$$

Negative electrode:

As an example, a supercapacitor with Berlin Green ($A_xFe_2(CN)_6 \cdot yH_2O$, x=0) anode and activated hard carbon cathode was assembled with an electrolyte of $NaClO_4$ in propylene carbonate (PC). In this kind of supercapacitor, the following electrochemical reactions occur during the charging process.

Positive electrode:

$$x ClO_4^- + \square \rightarrow x(ClO_4^-)//\square^+ + xe^-; \square = \text{activated carbon}$$

Negative electrode:

$$x Na^+ + Fe_2(CN)_6 + xe^- \rightarrow Na_xFe_2(CN)_6;$$

The reaction on the positive electrolyte occurs quickly because the anions are just absorbed on the electrode surface. As to the anodic reaction, sodium-ions have to diffuse into the interstitial space of Berlin Green material. This step has been evaluated in an electrochemical cell consisting of Berlin Green electrode and sodium metal electrode. Berlin Green showed an excellent rate capability.

Figure 3A:
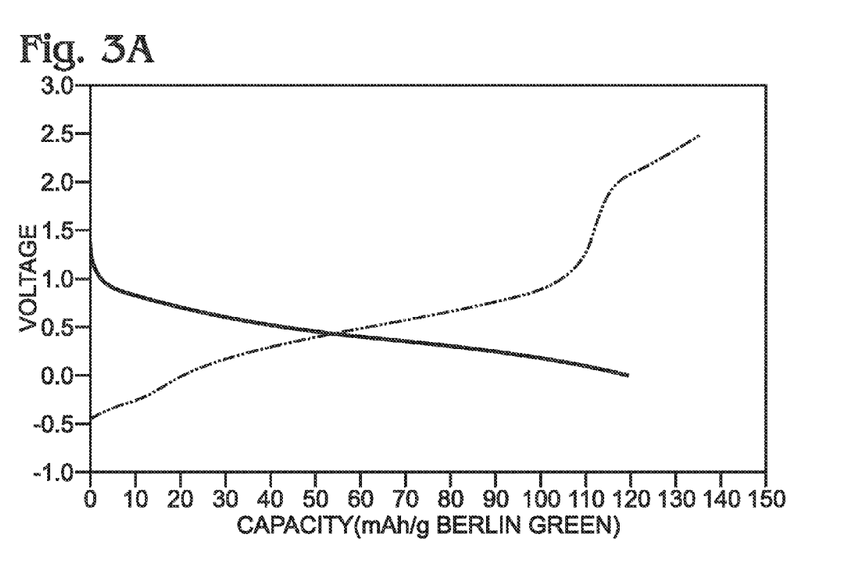
FIGS. 3A and 3B demonstrate the behavior of a supercapacitor with an activated carbon positive electrode and a Berlin Green negative electrode.
Figure 3B:
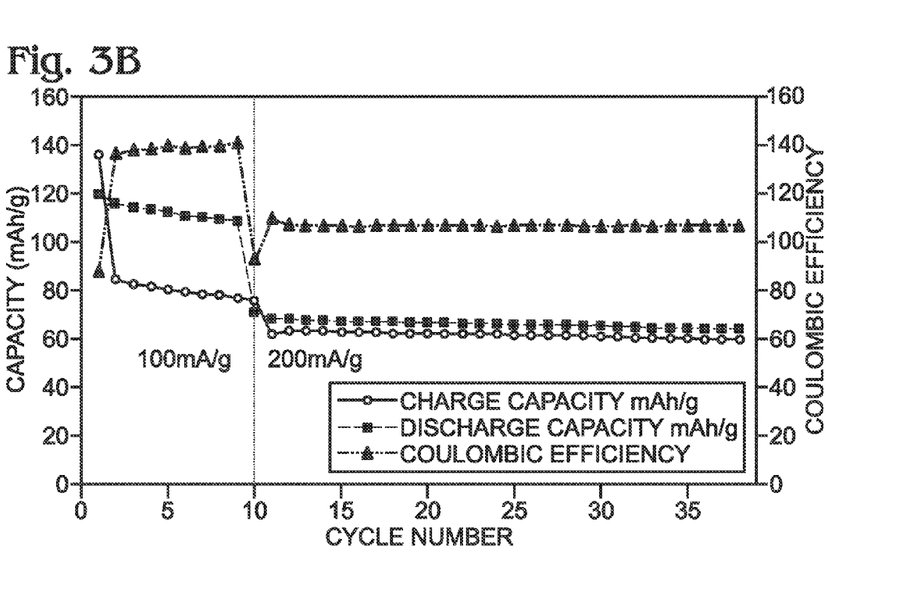

FIGS. 3A and 3B demonstrate the behavior of a supercapacitor with an activated carbon positive electrode and a Berlin Green negative electrode. At a current of 100 milliamps per gram (mA/g), the Berlin Green supercapacitor delivered a capacity of ~110 milliamp hours per gram (mAh/g). After optimizing the electrode ratio and electrolyte, the supercapacitor worked at a high power density with a considerable energy density. FIG. 3A depicts the voltage vs. capacity of the Berlin Green supercapacitor in the first charge/discharge cycle. FIG. 3B depicts the capacity retention of the Berlin Green supercapacitor.

Figure 4:
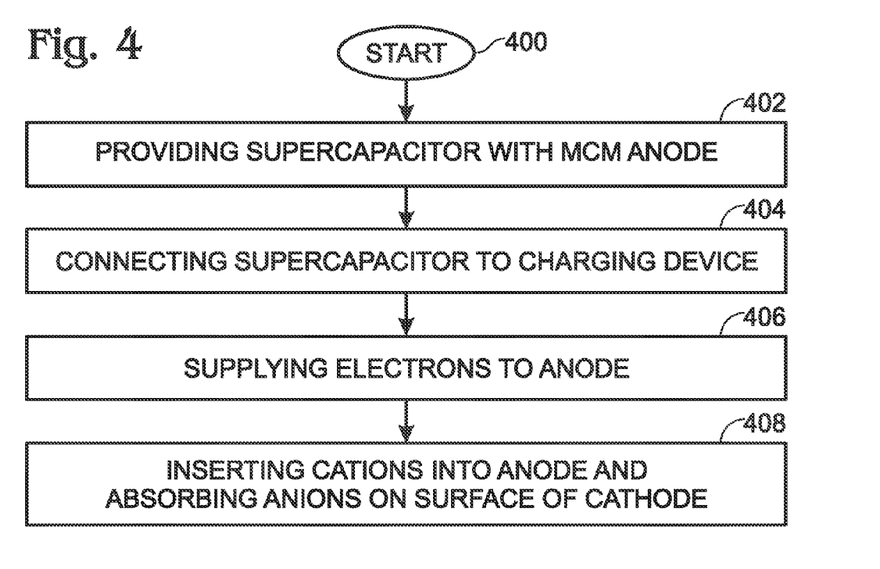
FIG. 4 is a flowchart illustrating a method for charging a supercapacitor.

FIG. 4 is a flowchart illustrating a method for charging a supercapacitor. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 400.

Step 402 provides supercapacitor comprising a metal cyanometallate (MCM) particle anode, an electrolyte including a salt (DB) comprising cations ($D^+$) and anions ($B^-$), and a cathode including carbonaceous materials ($\square$), see FIG. 2. Step 404 connects an external charging device (current source) between the anode and cathode. In Step 406 the charging device supplies electrons to the anode and accepts electrons from the cathode. In response to the charging device, Step 408 inserts cations into the anode, and absorbs anions on a surface of the cathode.

Providing the anode in Step 402 includes the MCM particles having the chemical formula. $A_XM1_YM2_Z(CN)_N \cdot MH_2O$;
where "A" is selected from a first group of metals;
where M1 and M2 are transition metals;
where X is less than or equal to 2;
where Y less than or equal to 1;
where Z is less than or equal to 1;
where N is less than or equal to 6; and,
where M is less than or equal to 20.

Step 408 performs the following reaction at the cathode:

$$dB^- + \square \rightarrow d(B^-)//\square^+ + be^-;$$

where "d" and "b" are quantities;
Step 406 performs the following reaction at the anode:

As noted above in the description of FIG. 2, the first group of metals includes alkali metals, alkaline earth metals, and combinations thereof. Specific examples from the first group of metals include lithium (Li), sodium (Na), potassium (K), rubidium (Rb), cesium (Cs), calcium (Ca), strontium (Sr), barium (Ba), silver (Ag), aluminum (Al), and magnesium (Mg).

M1 and M2 are each independently derived, and are typically selected from the following group: titanium (Ti), vanadium (V), chromium (Cr), manganese (Mn), iron (Fe), cobalt (Co), nickel (Ni), copper (Cu), zinc (Zn), Ca, Mg, strontium (Sr), and barium (Ba). The cations may be hydrogen (H), Li, Na, K, ammonium ($NH_4$), Rb, Cs, Mg, Ca, Sr, Ba, Co, Fe, Cu, tetramethylammonium, tetraethylammonium, or combinations thereof. The anions may be fluorine (F), chlorine (Cl), bromine (Br), iodine (I), carbon trioxide ($CO_3$), sulfur trioxide ($SO_3$), sulfate ($SO_4$), phosphate ($PO_4$), aluminate anion ($AlO_2$), nitrate ($NO_3$), hydroxide ($OH^-$), perchlorate ($ClO_4$), tetrafluoroborate anion ($BF_4^-$), hexafluorophosphate ($PF_6$), hexafluoroarsenate ion ($AsS_6$), trifluoromethanesulfonic ($CF_3SO_3$), N-fluoromethanesulfony ($N(SO_2CF_3)_2$), N-fluoroethanesulfony imide ($N(SO_2CF_2CF_3)_2$), or combinations thereof.

The electrolyte may be an aqueous, non-aqueous, polymer, gel, or solid electrolytes. The carbonaceous materials of the cathode may be activated carbon, carbon black, carbon paper, or carbon cloth.

Although not explicitly shown in FIG. 4, the process of discharging the supercapacitor is essentially the reverse of the charging process, with the anode and cathode being connected to a load instead of a current source. The reactions at the anode and cathode during discharge are presented below.

Positive electrode:

Negative electrode:

A supercapacitor with a metal cyanometallate anode and carbon cathode has been provided with an associated charging method. Examples of particular materials and process steps have been presented to illustrate the invention. However, the invention is not limited to merely these examples. Other variations and embodiments of the invention will occur to those skilled in the art.

We claim:

1. A supercapacitor comprising:
   an anode comprising metal cyanometallate (MCM) particles overlying a current collector, the MCM particles having a chemical formula $A_XM1_YM2_Z(CN)_N \cdot mH_2O$;
   where "A" is selected from a first group of metals;
   where M1 and M2 are transition metals;
   where X is less than or equal to 2;
   where Y is less than or equal to 1;
   where Z is less than or equal to 1;
   where N is less than or equal to 6;
   where m is less than or equal to 20;
   a cathode including carbonaceous cathode materials overlying a current collector; and,
   an electrolyte including cations capable of insertion/de-insertion with the anode and selected from a second group of materials, and anions capable of adsorption/de-adsorption on a surface of the cathode and selected from a third group of materials.

2. The supercapacitor of claim 1 wherein the first group of metals is selected from a group consisting of alkali metals, alkaline earth metals, and combinations thereof.

3. The supercapacitor of claim 2 wherein the first group of metals is selected from a group of metals consisting of lithium (Li), sodium (Na), potassium (K), rubidium (Rb), cesium (Cs), calcium (Ca), strontium (Sr), barium (Ba), silver (Ag), aluminum (Al), and magnesium (Mg).

4. The supercapacitor of claim 1 wherein M1 and M2 are each independently derived, as selected from a group consisting of titanium (Ti), vanadium (V), chromium (Cr), manganese (Mn), iron (Fe), cobalt (Co), nickel (Ni), copper (Cu), zinc (Zn).

5. The supercapacitor of claim 1 wherein the second group of materials is selected from a group consisting of hydrogen (H), Li, Na, K, ammonium ($NH_4$), Rb, Cs, Mg, Ca, Sr, Ba, Co, Cu, tetra ethylammonium, tetraethylammonium, and combinations thereof.

6. The supercapacitor of claim 1 wherein the third group of materials is selected from a group consisting of fluorine (F), chlorine (Cl), bromine (Br), iodine (I), carbon trioxide ($CO_3$), sulfur trioxide ($SO_3$), sulfate ($SO_4$), phosphate ($PO_4$), aluminate anion ($AlO_2$), nitrate ($NO_3$), hydroxide ($OH^-$), perchlorate ($ClO_4$), tetrafluoroborate anion ($BF_4^-$), hexafluorophosphate ($PF_6$), hexafluoroarsenate ion ($AsS_6$), trifluoromethanesulfonic ($CF_3SO_3$), N-fluoromethanesulfony ($N(SO_2CF_3)_2$), N-fluoroethanesulfony imide ($N(SO_2CF_2CF_3)_2$), and combinations thereof.

7. The supercapacitor of claim 1 wherein the electrolyte is selected from a group consisting of aqueous, non-aqueous, polymer, gel, and solid electrolytes.

8. The supercapacitor of claim 1 wherein the cathode includes carbonaceous cathode materials, selected from a group consisting of activated carbon, carbon black, carbon paper, and carbon cloth, adsorbing/de-adsorbing the anions.

9. A method for charging a supercapacitor, the method comprising:
   providing supercapacitor comprising:
       a metal cyanometallate (MCM) particle anode, having a chemical formula $A_XM1_YM2_Z(CN)_N \cdot mH_2O$;
       where A is selected from a first group of metals;
       where M1 and M2 are transition metals;
       where X is less than or equal to 2;
       where Y is less than or equal to 1;
       where Z is less than or equal to 1;
       where N is less than or equal to 6;
       where m is less than or equal to 20
       an electrolyte including a salt (DB) comprising cations ($D^+$) from a second group of materials capable of insertion with the anode, and anions ($B^-$) from a third group of materials capable of adsorption on a surface of a cathode;
       the cathode including carbonaceous materials (□);
   connecting an external charging device between the anode and cathode;
   the charging device supplying electrons to the anode and accepting electrons from the cathode;
   in response to the charging device:
       inserting cations (D+) into the anode; and,
       adsorbing anions (B−) on a surface of the cathode.

10. The method of claim 9 wherein adsorbing anions on the surface of the cathode during charge includes performing the following reaction at the cathode:

where "d" and "b" are quantities; and, wherein inserting cations into the anode includes performing the following reaction at the anode:

11. The method of claim 9 wherein where the first group of metals is selected from a group consisting of alkali metals, alkaline earth metals, and combinations thereof.

12. The method of claim 11 wherein the first group of metals is selected from a group of metals consisting of lithium (Li), sodium (Na), potassium (K), rubidium (Rb), cesium (Cs), calcium (Ca), strontium (Sr), barium (Ba), silver (Ag), aluminum (Al), and magnesium (Mg).

13. The method of claim 9 wherein M1 and M2 are each independently derived, as selected from a group consisting of titanium (Ti), vanadium (V), chromium (Cr), manganese (Mn), iron (Fe), cobalt (Co), nickel (Ni), copper (Cu), zinc (Zn).

14. The method of claim 9 wherein cations are a material selected from a group consisting of hydrogen (H), Li, Na, K, ammonium ($NH_4$), Rb, Cs, Mg, Ca, Sr, Ba, Co, Fe, Cu, tetramethylammonium, tetraethylammonium, and combinations thereof.

15. The method of claim 9 wherein the anions are a material selected from a group consisting of fluorine (F), chlorine (Cl), bromine (Br), iodine (I), carbon trioxide ($CO_3$), sulfur trioxide ($SO_3$), sulfate ($SO_4$), phosphate ($PO_4$), aluminate anion ($AlO_2$), nitrate ($NO_3$), hydroxide ($OH^-$), perchlorate ($PO_4$), tetrafluoroborate anion ($BF_4^-$), hexafluorophosphate ($PF_6$), hexafluoroarsenate ion ($AsS_6$), trifluoromethanesulfonic ($CF_3SO_3$), N-fluoromethanesulfony ($N(SO_2CF_3)_2$), N-fluoroethaesulfony imide ($N(SO_2CF_2CF_3)_2$), and combinations thereof.

16. The method of claim 9 wherein the electrolyte is selected from a group consisting of aqueous, non-aqueous, polymer, gel, and solid electrolytes.

17. The method of claim 9 wherein the cathode includes carbonaceous cathode materials selected, from a group consisting of activated carbon, carbon black, carbon paper, and carbon cloth, adsorbing the anions.

* * * * *

UNITED STATES PATENT AND TRADEMARK OFFICE
CERTIFICATE OF CORRECTION

| | |
|---|---|
| PATENT NO. | : 9,443,664 B2 |
| APPLICATION NO. | : 14/274686 |
| DATED | : September 13, 2016 |
| INVENTOR(S) | : Yuhao Lu, Long Wang and Jong-Jan Lee |

It is certified that error appears in the above-identified patent and that said Letters Patent is hereby corrected as shown below:

In the claims,

In column 8, line 17, claim 5, the word "tetramethylammonium" has been incorrectly printed as --tetra ethylammonium--. Claim 5 should read as follows:

5. The supercapacitor of claim 1 wherein the second group of materials is selected from a group consisting of hydrogen (H), Li, Na, K, ammonium (NH4), Rb, Cs, Mg, Ca, Sr, Ba, Co, Fe, Cu, tetramethylammonium, tetraethylammonium, and combinations thereof.

Signed and Sealed this
Eighteenth Day of October, 2016

Michelle K. Lee
*Director of the United States Patent and Trademark Office*